Sept. 18, 1956  J. W. FOSTER  2,763,361
TROUGHED BELT CONVEYOR
Filed Dec. 29, 1952  9 Sheets-Sheet 2

FIG. 2A.

Inventor
John William Foster
By
Dowell & Dowell
Attorneys

Sept. 18, 1956 J. W. FOSTER 2,763,361
TROUGHED BELT CONVEYOR
Filed Dec. 29, 1952 9 Sheets-Sheet 6

Inventor
John William Foster
By Dowell & Dowell
Attorneys

Sept. 18, 1956  J. W. FOSTER  2,763,361
TROUGHED BELT CONVEYOR

Filed Dec. 29, 1952 9 Sheets-Sheet 7

Inventor
John William Foster
By
Dowell Dowell
Attorneys

FIG. 14.

Inventor
John William Foster
By Dwell & Dwell
Attorneys

Sept. 18, 1956 J. W. FOSTER 2,763,361
TROUGHED BELT CONVEYOR
Filed Dec. 29, 1952 9 Sheets-Sheet 9

Inventor
John William Foster
By
Dowell & Dowell
Attorneys

United States Patent Office 2,763,361
Patented Sept. 18, 1956

2,763,361

TROUGHED BELT CONVEYOR

John William Foster, London, England, assignor of one-half to Ropeways Limited, London, England Application December 29, 1952, Serial No. 328,403

Claims priority, application Great Britain January 11, 1952

13 Claims. (Cl. 198—191)

This invention relates to conveyors and the like and more particularly to travelling conveyors of the general type in which an endless load conveying surface extends in upper and lower reaches between two spaced tumbler rollers, wheels or the like, one at least of which is driven and round both of which the conveying surface passes. On its upper load carrying reach between the tumblers the conveying surface or the like is usually dished transversely to hold the material conveyed thereon and, as it passes round the tumblers, is flattened in transverse section to avoid stretching of its longitudinal edges.

Known conveying apparatus of this kind employs endless belts for conveying surfaces, the belts being supported between the tumblers, on a series of idler rollers. The belt is used as the medium not only for suspension of the load between the idler rollers but also for hauling the materials conveyed. Thus the belt, particularly in the case of conveyors of considerable length and high capacity, has to be of heavy and expensive material such as rubber or the like. Where the conveyor also lifts the load up slopes these factors are especially important.

The object of the present invention is to provide conveyors of this kind which will be simpler and less expensive to install and maintain than the known types of endless belt conveyors.

According to the invention an endless conveyor apparatus comprises an endless unit, formed by a number of longitudinally interconnected trollies or the like and a number of load carrying surfaces interconnecting some or all of the trollies or the like, end tumbler rollers or the like, tracks along which the trollies or the like move and which support and guide the trollies or the like along upper load carrying and lower return reaches and round the tumbler rollers or the like, and separate means for imparting a drive or haul continuously to the unit through the trollies or the like.

In one construction the trollies or the like are all longitudinally connected together by pallets or other load carrying surfaces or by an endless belt secured to the trollies, to form an endless conveyor. In another construction some of the trollies or the like are interconnected by the load carrying surfaces while the remaining trollies are interconnected by nonload carrying links or like members.

Preferably one or more ropes, chain of ropes, chains or the like forming endless driving means are attached to the trollies, carriages or the like; at their ends the ropes or the like pass round rollers, wheels or the like preferably coaxial with the tumblers or the like. At least one of the last named rollers, wheels or the like are driven by a suitable prime mover to drive or haul the trollies or the like along their tracks and thus advance the load carrying surfaces. Also where the load on the conveying surface for example tends to urge the endless unit to overrun, as on inclined reaches for example, the rope chains act as a brake to retard movement of the trollies.

The sides of the trollies or the like are preferably articulated to their central portions and are raised while travelling along the upper conveyor reach so that the conveying surface mounted on them is troughed. The pallets may be made of flexible material or have articulated side sections so that they conform to the rise and fall of the sides of the trollies or the like to form a troughed conveying surface.

As the articulated trollies or the like approach the delivery end tumbler their sides are lowered onto the planes of their central portions. As the trollies or the like leave the upper portion of the receiving end tumbler their sides are raised to form the troughed upper reach.

In an alternative construction each outer side portion of each trolley or the like is pivotally connected to its central transverse portion, and means are provided at or adjacent to the tumbler rollers or the like for pivoting the outer portions of the trollies or the like about their central portions when they engage or are adjacent to the tumbler rollers or the like whereby the marginal belt portions are moved into substantially the same transverse plane as the central portion of the belt or vice versa so that the belt is substantially flat in transverse section as it moves round the tumbler rollers or the like and is dished when it moves along its upper reach.

The trollies of each of the above constructions or the like are preferably interconnected by links of a rope chain, lengths of chain or like means, or they may be secured in spaced relation to an endless rope, chain or the like. The rope chain, endless chain or the like passes round tumbler rollers, sprocket wheels or the like at the ends of the conveyor; these tumbler rollers or the like or one of them is driven by a suitable prime mover.

The apparatus may also be used for conveying loads round curves or bends, the inner sides of the trollies being raised by elevating their tracks to maintain the pallets in the substantially horizontal plane; alternatively the outer track may be lowered, or a combination of these two track alterations may be employed. Check rails or the like may also be provided on the outer tracks to prevent the trolley wheels leaving their tracks.

To unable the invention to be more fully understood it will now be described with reference to the accompanying drawings in which.

Figure 14:
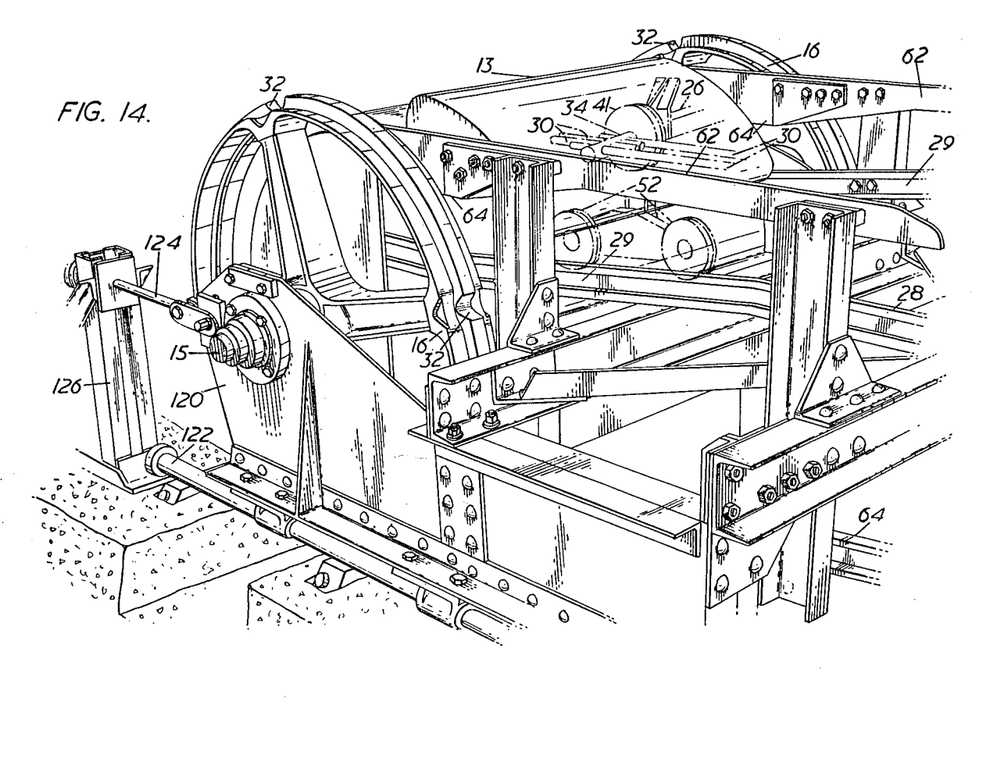
Fig. 14 is a fragmentary side perspective view of a tumbler and associated structure on a larger scale.
Figure 15:
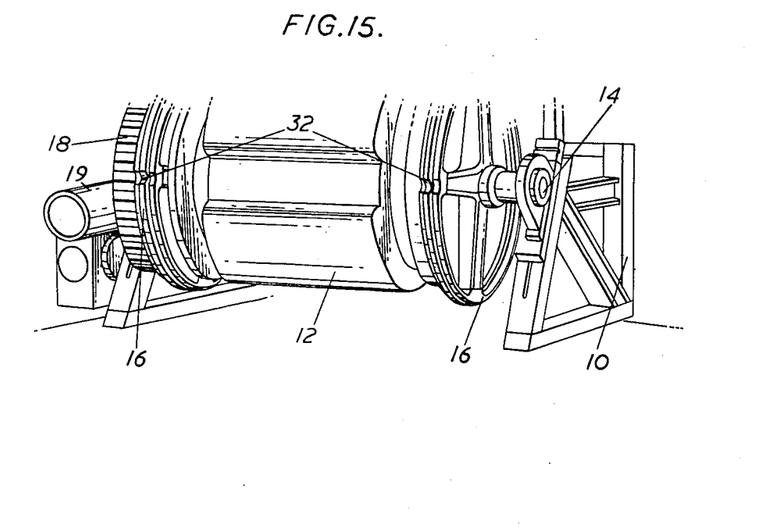
Fig. 15 is a fragmentary end perspective view of a tumbler.

Referring to the drawings the conveying apparatus comprises a framework 10 in which are mounted tumblers 12, 13 (see especially Figs. 14 and 15) journalled respectively on shafts 14, 15 rotatably mounted in bearings in the frame. The tumbler shafts 14, 15 extend beyond the frame 10 and are provided on each side with a sprocket 16 for driving conveyor hauling means as will be described. The shaft 14 is extended beyond the sprockets 16 and carries a drive wheel such as a gear wheel 18 in mesh with a gear wheel 20 to which a drive is imparted through a suitable drive gear 19 from a prime mover 22 such as an electric motor.

Figure 16:
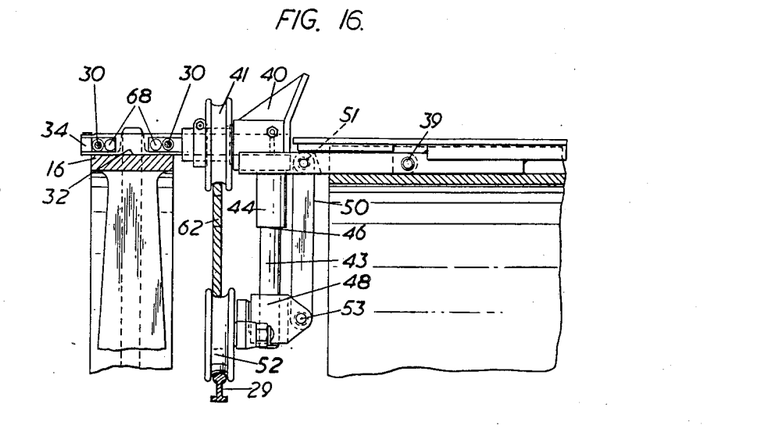
Fig. 16 is a fragmentary sectional view, similar to Fig. 3, showing a trolley passing round a tumbler.

The conveyor surface consists of a number of serially arranged pallets 24 or other load carrying surfaces connected to spaced trollies 26 running on tracks 28 and having a rope chain 30 or like means for hauling or retarding the conveyor surface by its trollies 26 without employing the pallets 24 for hauling. Means (to be described) are provided to raise the sides of the pallets to form a trough-like conveyor for transporting loads. The drive is imparted to the rope chains from the sprockets 16 or like members at the tumblers, 14, 15 round which the pallets move at the conveyor receiving and delivery ends; slots 32 are provided in the sprockets 16 in which engage cross members 34 on the rope chains 30 as shown best in Figs. 14, 15 and 16. The cross members 34 are secured to the trollies as will be described. Additional cross members may be provided for connecting chain or like links together between the trollies.

Each trolley (Figs. 3 and 4) preferably consists of a substantially flat central portion 36 having extensions 35 by which they are supported on the tracks 28. A terminal piece 40 is secured to the outer end of each extension 35. The cross members 34 are secured to these extension pieces 40. Wheels 41 or slides are mounted on the terminal pieces 40 which also have downwardly extending preferably integral members 44 forming guides on their lower ends 43 for sliding brackets 48 on which are mounted wheeled bogies 52 or like devices. Stops formed by shoulders 46 are provided on these downwardly extending brackets 44 to limit the upward sliding movement of the brackets 48. The side portions 35 of the trollies have side members 38 hinged on the pins 39 about axes, longitudinally of the conveyor, to the extensions 35 adjacent to the ends of the central trolley portion 36 so that in their lower portions they lie substantially in the plane of the central portion 36 and when raised to about 45° they support the outer portions 54 of the conveying surface thus forming a dished conveyor. The angle to which the trolley sides are raised is not however crucial.

Figures 3, 4:
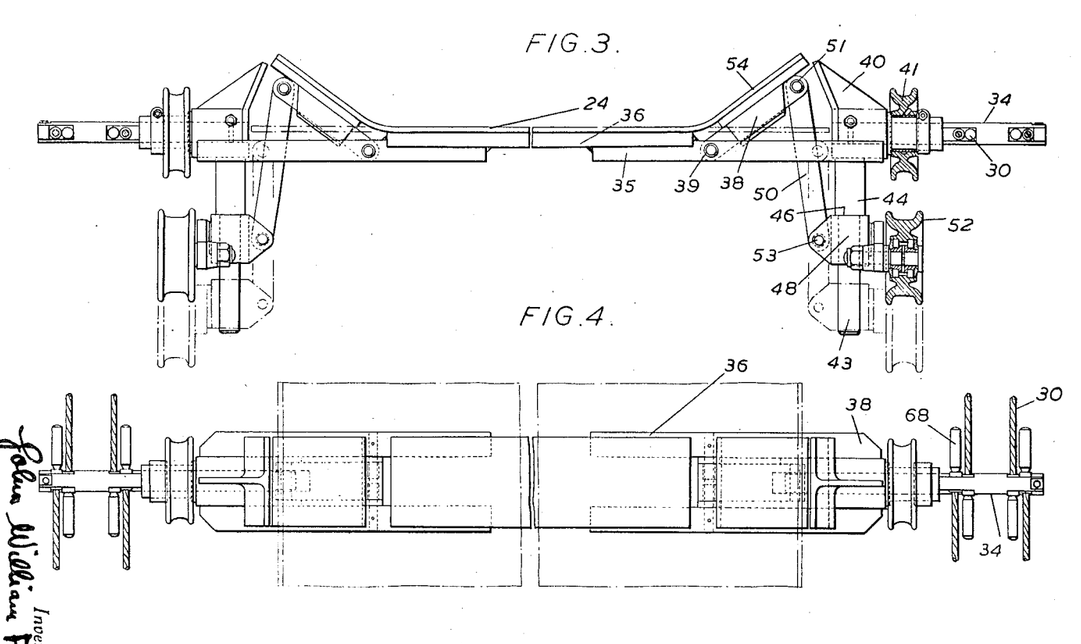
Fig. 3 is a transverse view partially in section of the trolley or the like to be described.
Fig. 4 is a plan view of Fig. 3.

Connecting rods 50 or the like are pivoted at their upper ends 51 to the hinged sides 38 of the trollies and at their lower ends they are pivoted by pins 53 to the bogey or like brackets 48.

Along each side of the upper conveyor reach a track 28 is arranged on which the bogey wheels 52 or the slide shoes 100 (Fig. 9) run or slide respectively. These tracks are positioned so that the weight of the travelling endless unit including the trollies and the load carried on it is transmitted through the extension 35 on the trolley to the bogey wheels 52 or slide 100, the brackets 48 being maintained in engagement with the stops 46 on the posts 44; at the same time the connecting rods 50 are forced upwards by the brackets to raise the trolley sides 54.

Figure 1A:
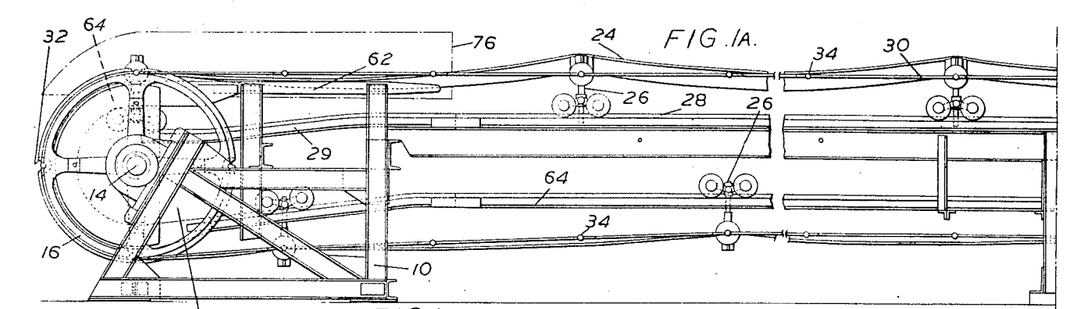
Figs. 1A and 1B show in side elevation the two ends (the receiving end Fig. 1B and the delivery end Fig. 1A) of a travelling conveyor according to the invention, it being understood that any suitable length of conveyor may be provided between the two ends.
Figure 1B:
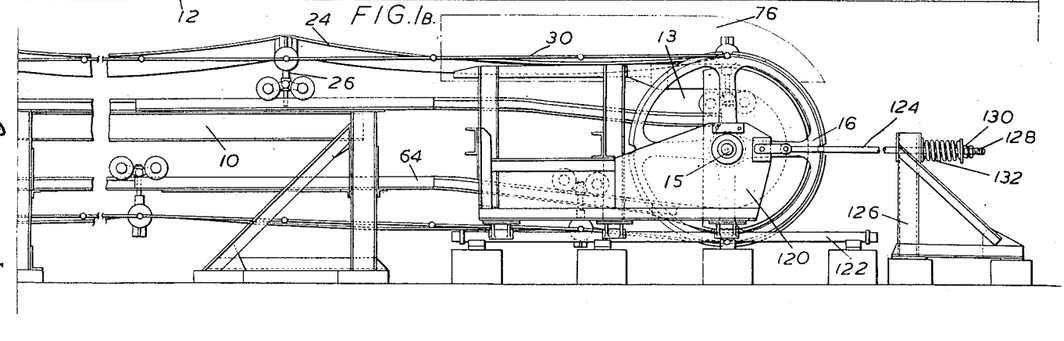
Figure 2:
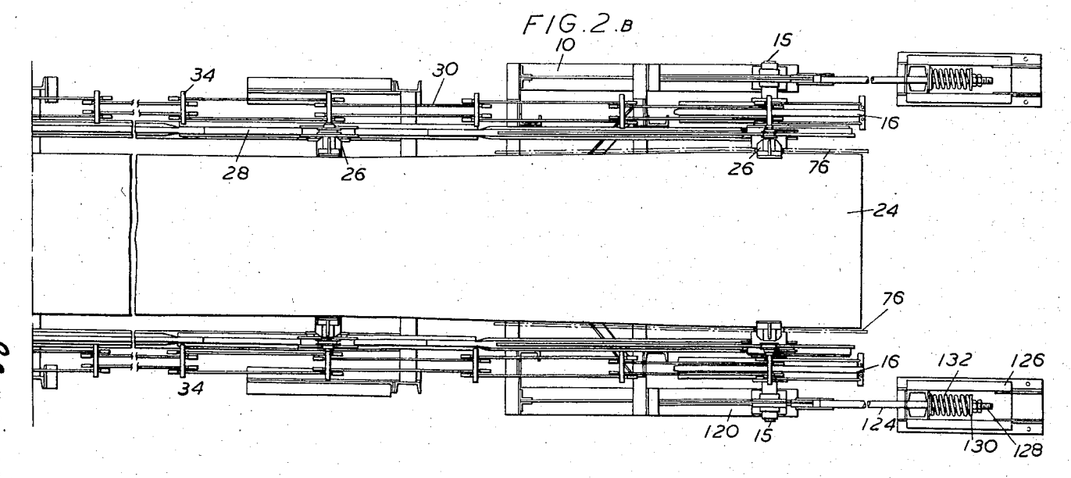
Figs. 2A and 2B are plan views of the ends of the conveyor shown in Figs. 1A and 1B respectively.
Figure 2A:
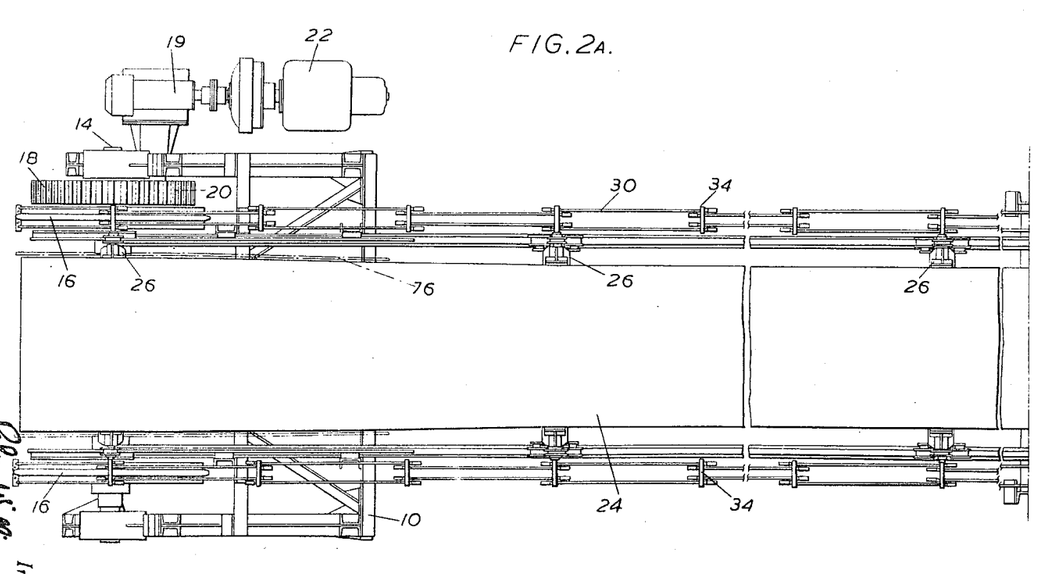

Adjacent the tumbler 13 or 13 at either end of the conveyor (Figs. 1A, 1B and 14), the bogey tracks 28 are inclined downwardly at 29 and are curved round the axis of the tumbler or as shown in Figs. 1A and 1B they may be omitted round the tumbler. As these tracks slope down a second track 62 is positioned above or outside them and parallel to them, curving round the tumbler axis and continuing as at 64 along the whole length of the lower reach. The upper tracks 62 are spaced vertically from the bogey tracks 28 by such a distance that the bogey wheels 52, which are preferably grooved as shown in Figs. 3 and 4 to assist in guiding them along the tracks, move freely between them.

A third track 64 is arranged round each tumbler 12, 13, and is disposed radially outwardly of the first tracks 29. These third tracks start at or adjacent to the point where the inclined part 29 of the first track 28 reaches its lowest point (Figs. 1A and 14) and are arranged to lie in the path of the underside of the wheels 41 on the trolley extensions.

As the bogey wheels 52 run down the inclined tracks 29 and curve round the tumbler they shift from rolling on the tracks 28, 29 onto the tracks 64 and continue along the lower conveyor reach with the trollies upside down. As the tracks 28, 29 slope down and the weight of the trollies is transferred from bogey wheels 52 to the single wheels 41, the bogies fall freely due to gravity, or alternatively are depressed by the underside of rail 64, thus in turn, pulling on the connecting rods 50 causing the hinged sides 38 to swivel into substantially the plane of the central portions of the trolley.

The receiving end of the conveyor is provided with similar tracks except that the second track 62 need not extend further round the upper part of the tumbler than the point where the bogey wheels have transferred their load completely to the first named tracks 28, 29.

Thus as the conveyor moves round the receiving end tumbler the bogey wheels 52 again move onto their upper reach tracks 28 with the trollies the right way up, and the trolley extension wheels run off the third tracks 64 so that the bogey brackets 48 rise to their stops 46 and lift the connecting rods 50 to raise the outer trolley sides 54 for troughing the conveyor surface.

Figure 5:
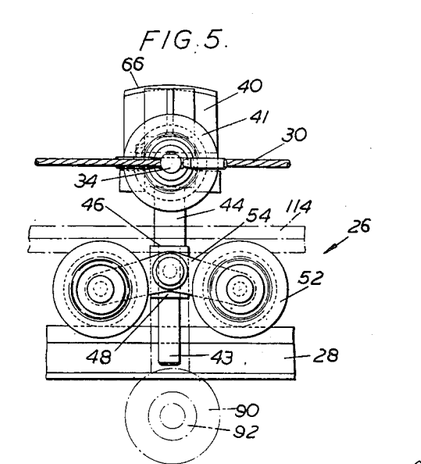
Fig. 5 is a side view of one of the trollies or the like shown in Figs. 3 and 4.

It will be understood (as will be seen from Figs. 1A and 1B) that the pallets will sag to some extent between the trollies particularly when loaded. The front and rear edges of the central and side trolley portions will therefore tend to cut into the underside of the pallets. To avoid this the upper surfaces of the central and/or side trolley portions 36, 54 are preferably outwardly convex as at 66 Fig. 5 so that the front and rear trolley edges are substantially tangential to the curves of the sagging pallets.

Idler rollers (not shown) may also be arranged beneath the pallets at the approach to the tumblers so that the sagging pallets are supported between the trollies as they approach and leave the tumblers. Thus the pallet surfaces are curved smoothly as they approach and engage the tumbler rollers.

The trollies are connected together by the load conveying surfaces or pallets. These are preferably in the form of plates secured at their ends to the central and side portion of the trollies. Or they may be continuous lengths of suitable material such as comparatively thin belting material extending over several trollies (as shown in the drawings). Thus they may be easily replaced wholly or partially when worn, by replacing the broken or worn pallets or belting material between the trollies.

The pallets may be of any suitable material such as thin rubber belting, canvas, nylon or the like so that they flex easily to conform to the raising and lowering of the trolley sides and move round the tumblers. They may be formed with central sections which may be of metal or other rigid materials to which the side sections are hingedly attached for hinging with the trolley sides.

Figure 10:
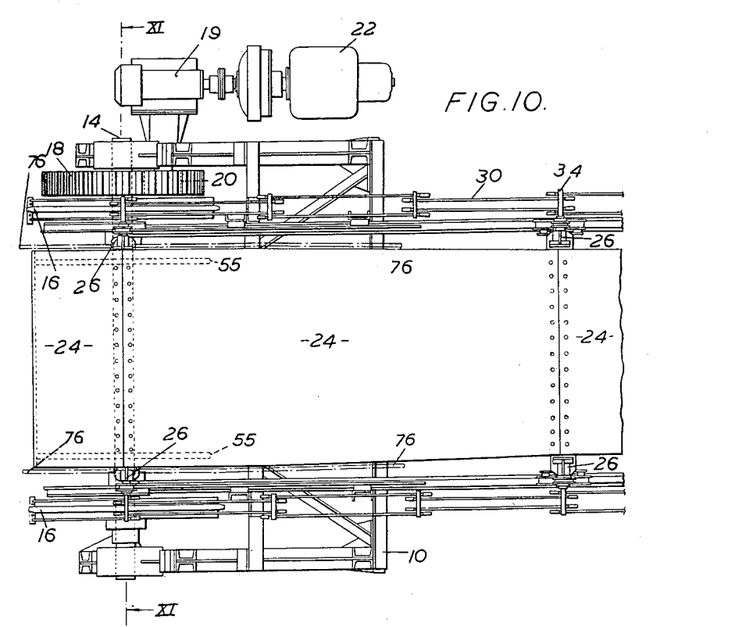
Fig. 10 is a partial diagrammatic plan view of the one end of the endless unit showing an alternative tumbler construction.

The tumblers are preferably in the form of rollers which act as supports for the pallets as they move round from one conveyor reach to the other. Where the conveying surfaces are of rigid material as in Fig. 10 the tumblers may be spaced rollers or wheels 55 to engage the trolley wheels only.

Preferably the extensions 34 are connected together by short sections or links of rope each section connecting two succeeding trolley extensions. Each rope link has a socket 68 secured to each end adapted to be secured in a chuck, coupler or like clamp on a trolley extension 34. Means of known construction which form no part of this invention, are preferably provided for releasing the links quickly from the couplers or clamps when it is desired to change a link or replace a broken one.

The rope links 30 are preferably of prestressed steel rope sections, and may be connected to the trolley extensions or to other parts of the trolleys by rope link couplers. Several links connected together by intermediate couplers which also form cross members 34 may be used between the trollies.

As explained above the ropes 30 or the like pass round the sprockets 16, the trolley extensions 34 and the intermediate couplers (where provided) entering the slots 32 in the sprocket wheels or discs 16. One or both of the tumbler shafts 14, 15 is driven by the prime mover 22; each end of the shafts 14, 15 may also be driven by such a prime mover. The prime movers are preferably synchronized by suitable mechanical or electrical means. Thus the drive is imparted to the sprockets or the like which in turn haul the rope chains or the like. It will be seen that by this means the haul of the conveyor is through the rope chains and not through the pallets or like conveying surfaces which may therefore be of light construction. Further, parts of the trolley central portions and sides may be cut away to lighten them. The tumblers round which the pallets or the like move are preferably driven with the sprockets or the like or they may be freely mounted on the sprocket or like shafts to idle, merely rotating under the frictional engagement with the moving pallets or the like. The sprockets 16 may however be integral with the tumblers 12 if desired, the tumblers having annular tracks 19 (Fig. 11 left hand side) which merge into and form continuations of the three above described tracks. In this construction the central portion of the tumblers may be omitted if desired as in Fig. 11.

The various parts of the trolley frames, namely the central portions 36, the extensions 35 and downwardly extending posts 44 may be bolted or welded together or they may be made in one piece if desired.

Figure 6:
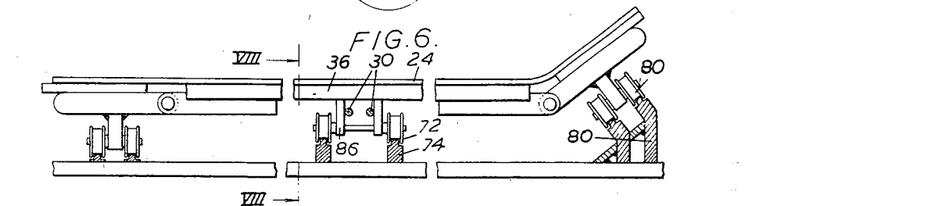
Figs. 6 and 7 are views similar to Fig. 3 of a modified construction showing the trolley or like sides tilted or flat.
Figure 7:
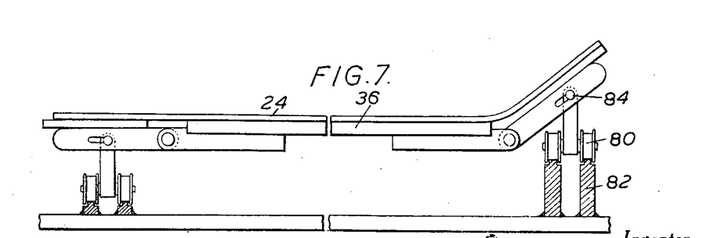
Figure 8:
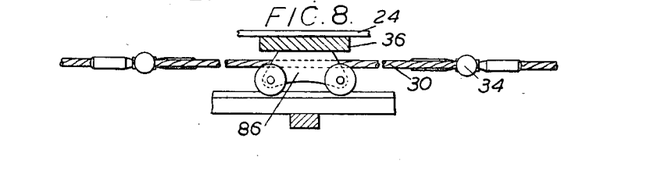
Fig. 8 is a side view of a trolley or the like in the conveyor shown in Figs. 6 and 7.

In an alternative construction according to the invention shown in Figs. 6–8 the conveying surface is made up of a number of longitudinal sections connected together by the trollies or the like. The sections as in the previously described construction are sufficiently flexible or are made of articulated members to enable them to curve round the tumbler rollers or the like without undue strain.

The tumblers and general layout are similar to that shown in Figs. 1A–5.

Figure 11:
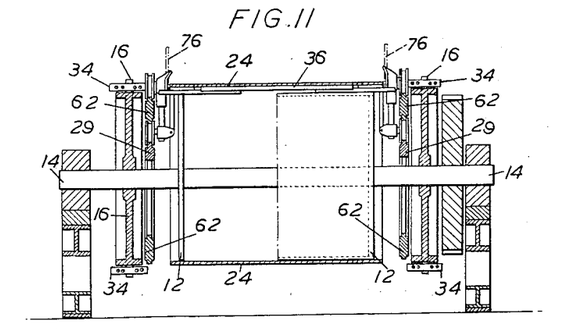
Fig. 11 is a cross section on the line XI—XI of Fig. 10 showing diagrammatically two constructions of the tumbler arrangement.

The central portions 36 of the trollies or the like have two transversely spaced double flanged wheels 72 arranged between the tumbler rollers or the like to run on the tracks and to run on central circular tumbler rollers or like tracks similar to those shown in the left hand side of Fig. 11 as the endless unit runs round the tumbler rollers or the like. Thus the endless unit is continuously supported throughout its upper reach and round the tumbler rollers or the like. With very wide conveying surfaces additional wheels 72 and tracks 74 may be provided as in Fig. 6.

The outer sides of the trollies are pivoted to the trolley central portions about an axis longitudinally of the conveyor. The marginal pallet portions integral with or pivoted to the central belt portion are secured to the outer trolley sides.

Each outer trolley side is provided with a flanged wheel 80 or pair of wheels as shown positioned to run on a track 82 arranged longitudinally of the conveyor. These tracks 82 are arranged so that between the tumbler rollers or the like the marginal portions of the belt are raised at an angle to the central portion thus making a dished conveyor, as shown in the right hand sides of Figs. 6 and 7.

At the approach of the upper reach to the tumbler the outer tracks 82 change direction so that the trolley wheels 80 running thereon drop causing the trolley sides to pivot about the central portion until the side portions are substantially on the same plane as the central portions. Since this will cause the path traced by the wheel to move away from the centre line of the conveyor the wheels 80 will run with their vertical planes at an angle with respect to the vertical plane of the tracks. To avoid the possibility of the wheels leaving the tracks, the latter may be canted as in Fig. 6 so that their running surfaces are always substantially perpendicular to the axes of the wheels 80.

Alternatively as shown in Fig. 7 the wheels 80 may be pivoted at 84 about longitudinal axes so that as the tracks rise the wheels 80 pivot about these axes and thus remain substantially parallel to the central wheels 72.

These outer tracks may be continuous or a separate set of tracks merging with them may be provided round the tumbler rollers or the like if desired.

If required cam tracks may be provided at the approach to the upper side of the tumbler roller or the like co-operating with followers on the trolley sides to urge the outer wheels 80 to maintain engagement with the tracks as they change position.

The trollies or the like are guided in the above manner as they approach and leave the tumbler rollers or the like at each end of the upper conveyor reach.

On passing from the tumbler rollers or the like into the lower reach the tracks overlap longitudinally another set of tracks arranged so that the wheels run on them and thus support the belt on the lower reach; these tracks preferably support both the central and outer trolley rollers and the outer tracks may maintain the conveyor surface substantially flat or cause it to be dished as desired. The upper and lower reach tracks preferably overlap round the tumbler rollers or the like.

A bracket 86 (Fig. 6) or the like is provided on the under side of each trolley. The brackets of succeeding trollies are connected together by short sections of rope 30 as in the first construction and each section has a clip secured at each end adapted to be secured in a chuck or like clamp, on the trolley bracket. Means are preferably provided for releasing the sections quickly from the chucks or clamps when it is desired to exchange a section.

The tumbler rollers or the like are provided with radially slotted members as in Figs. 1A and 1B arranged so that the trolley brackets or the rope link couplers or cross members 34 engage in the slots as they pass round the tumbler rollers or the like, one or both of which are driven, thus imparting the drive to the conveyor surfaces through the rope chain. This drive means may be arranged independently of the tumbler rollers or the like which may be idlers if desired, or both independent and tumbler rollers drives may be provided.

Any number of drive ropes or the like may be provided to suit the load to be hauled.

While for some purposes the tracks are preferably in the form of rails, for other purposes such as truck conveyors in mines for coal transport for example, rope tracks may be used. Such rope supports may be spaced any suitable distance apart. Such constructions are equally suitable for conveyors running up hill sides or over ravines, the rope supports being in the form of trestles.

Where the conveyors are used to cover long distances intermediate drive means (Figs. 12 and 13) are provided to impart a haul to the rope chains through the cross members 34.

Figures 9, 12, 13:
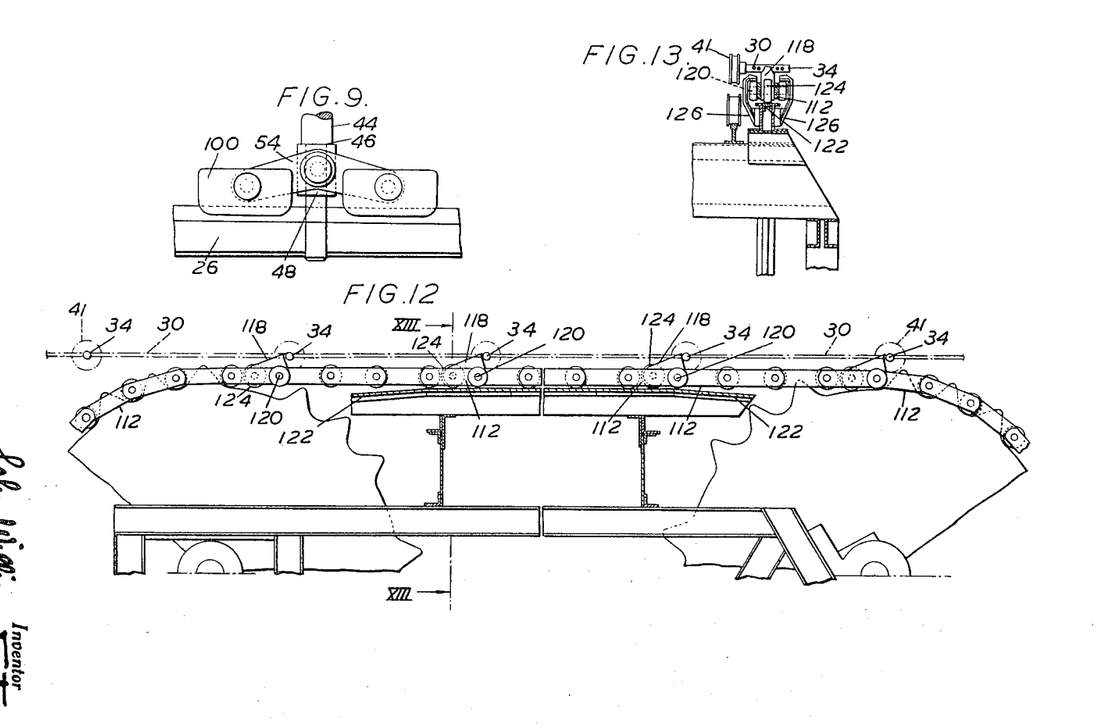
Fig. 9 is a partial diagrammatic figure showing slide shoes 100 as an alternative to the wheels 52 in Fig. 5.
Fig. 12 is a side view to a larger scale of intermediate hauling drive means.
Fig. 13 is a cross section of one side of the apparatus on the line XIII—XIII in Fig. 12 looking in the direction of the arrows.

The intermediate drive means are shown in the form of endless sprocket chains 112 running at their ends round driven sprockets 114 (shown diagrammatically). A number of spaced pawls 118 are rotatably mounted on the chain pins 120 which engage the cross members 34 and impart a drive to them thus hauling the rope chains. The upper sprocket chain reach is supported on a track 122 on which wheels or rollers 124 on the pawls 118 run to prevent the chain sagging; thus the pawls 118 are mounted in driving contact with the members 34. As shown in Fig. 13 guides 126 are provided to keep the chain on the track 112. The sprockets 114 are driven by a suitable prime mover such as the electric motor 116, all the electric motors including the motor 22 being connected for simultaneous operation from a central control point.

In certain conveying apparatus, particularly for hauling over long distances it is frequently necessary to lay the conveyor over curved sections or to take it round bends as in tortuous workings in coal mines for example. It will be understood that in rounding such bends the outer rope chains will be in tension while owing to the shorter radius the rope chains on the inside of the bend will hang freely and unstrained. Similarly the inner edges of the pallets will tend to become slack, and the outer trolley bogey wheels will tend to rise off their tracks.

To overcome this tendency to overturn, a check rail or like guide (as shown at 114 in dotted lines in Fig. 5) is arranged above the outer tracks 28 and 64 and is positioned above the wheels 52 to prevent them rising off their tracks. At the same time the inner bogey tracks 28 and 64 are inclined upwards at each end of the bend and run in an elevated path round the bend thus raising the inner trolley bogies to maintain the conveying surface or pallets substantially generally flat and troughed as they round the bend.

In conveyors for rounding bends intermediate drive means such as shown in Fig. 12 are preferably provided at each end of the curve, preferably on the straight portions of the conveyor adjacent the ends of the curve, to reduce the haulage tension to a minimum round the bend.

It will be understood that the bogey tracks 28, 64 are preferably provided at each side of the conveyor, but except for bends they may be arranged at one side only, the other sides of the trollies being supported by slide shoes running on guide rails, or by other supporting means.

The rope chains 30 or like haulage transmission means are preferably provided at both sides of the apparatus, but they may be provided at one side only if desired. One or more rope chains may be supplied at each side of the trolley according to the load to be conveyed, two being shown in the drawings. While rope chains in links are preferred, long lengths of chain may be employed to which the trolley extensions 34 are secured. These chains are preferably provided with blocks or the like at spaced intervals forming the cross members 34 which engage the sprocket or disc slots 32 to ensure a positive drive.

Additional wheels 72 and tracks 74 (Fig. 6) may be provided centrally of the trollies of Figs. 1A-5 if desired. Also the rope chains 30 of Figs. 1A-5 may be arranged beneath the trollies (as in Fig. 6) instead of or in addition to those at the sides of the conveyor. Side rope chains are preferred as they are more accessible for maintenance and replacement.

Suitable screens 76 (dotted in Figs. 1A and 2A) may be provided adjacent to the sides of the conveying surface especially at the tumblers to prevent the conveyed load spilling over the sides of the conveying surface when the trollies flatten out. Similar screens may be provided round bends.

While conveyors having continuous load carrying surfaces have been described, some of the trollies may be interconnected by pallets or the like while the others are either interconnected by rigid links or even only by the rope links or the like hauling means. In such constructions the means (not shown or described as it does not form part of this invention for feeding the load to be conveyed onto the receiving end of the conveyor) may be arranged to deliver intermittently to the conveyor so that the feed only takes place while load carrying surfaces pass beneath the feeding means, the feed being stopped as the gaps between trollies are passing the feeding means. Such an arrangement is particularly useful where the conveyor is used for delivering measured quantities in succession to a series of containers positioned one after the other at the delivery end of the conveyor.

The tracks or the like on which the trolley bogey wheels run are preferably continuous, but they may be broken or have gaps at intervals to allow for expansion or contraction in hot climates for example, the gaps being short enough to ensure the wheels not falling into them, or becoming derailed and then jamming the endless unit.

A fourth wheel 90 (Fig. 5 in dotted lines) may be provided on an extension 92 on each bogey to engage the under side of the tracks along the upper and lower reaches to prevent the trollies jumping off the tracks particularly where going round curves; in such constructions the check rails or the like on curves may be omitted.

As shown in Figs. 1B and 2B the receiving end tumbler mechanism is mounted in a sliding frame 120 which can slide on the bed 122 of the apparatus. A drawbar 124 is attached to the frame 120 and passes through a rigid frame 126 secured to the bed 122. The drawbar 124 has a threaded end 128 on which nuts 130 may be tightened or loosened to take up slack in the endless unit or to ease off the tension therein. A spring 132 or other buffer is included to absorb any shock on the apparatus.

Alternatively other suitable tension means may be provided such as a weight working on a cable connected to the drawbar 124 and running round a pulley on the frame 126.

Where the prime movers are electric motors these are provided with the normal cut out fuses which fail when the motors become overloaded as a result of a jam or a break in the conveyor. Where other types of prime movers are employed, suitable means may be provided such as clutching devices which, when a jam or a break in the conveyor occurs, will be automatically disconnected to halt the drive and prevent damage to the moving parts of the conveyor.

All the parts of the conveying apparatus including the pallets and rope chains are of unitary standard construction thus facilitating and reducing the cost of, maintenance and the replacement of broken or damaged parts. Further the conveying apparatus can be quite simply increased or decreased in length by the addition or removal of the requisite number of lengths of rope chain, tracks and trollies, while the tumbler mechanism is shifted to the new position.

The trollies may be of standard construction with removable central portions; thus by fitting central portions and conveying surfaces of different widths, the trollies may be adapted for use in conveyors of any width.

Further inspection and repair of parts of the apparatus, except for the comparatively simple supervision of the tracks and for serious breakdowns, can be carried out at the tumbler ends.

I claim:

1. A travelling conveyor apparatus comprising a frame, tumbler rollers rotatably mounted one at each end of said frame, an endless unit formed by a number of longitudinally interconnected trollies and a number of load carrying surfaces interconnecting at least some of said trollies, said endless unit passing round said tumbler rollers and extending between said tumbler rollers over an upper load carrying reach and a lower return reach, tracks along which said trollies move and which support and guide said trollies along said upper and lower reaches and round said tumbler rollers, the sides of said trollies and the load carrying surfaces being hingedly connected to the central portions thereof, members on said central portions running on said tracks round said tumbler rollers, downwardly extending posts on said trolley central portions, other members on bearings slidably arranged on said posts running on said tracks along said upper and lower reaches which tracks are inclined as they approach said tumbler rollers so that said first named members are led onto said tumbler tracks, links pivoted to said bearings and said trolley central portions so that when said other members on said bearings travel down said inclined tracks said links fall with said other members and allow said side portions of said trollies and load carrying surfaces to fall substantially into the plane of said central portions, and endless hauling means attached to said trollies and passing round rollers substantially concentric with said tumbler rollers, at least one of said hauling rollers being driven by a prime mover.

2. A travelling conveyor apparatus comprising a frame, tumbler rollers rotatably mounted one at each end of said frame, an endless unit formed by a number of longitudinally interconnected trollies and a number of load carrying surfaces interconnecting at least some of said trollies, said endless unit passing round said tumbler rollers and extending between said tumbler rollers over an upper load carrying reach and a lower return reach, tracks along which said trollies move and which support and guide said trollies along said upper and lower reaches and round said tumbler rollers, means for tilting the side portions of said trollies and load carrying surfaces along said upper reach, means for flattening said side portions as they approach said tumbler rollers, endless hauling means attached to said trollies and passing round rollers substantially concentric with said tumbler rollers, at least one of said hauling rollers being driven by a prime mover; and means for raising said side portions of said trollies and load carrying surfaces with respect to said central portions thereof and for lowering said side portions to flatten said trollies and surfaces as they approach said tumbler rollers.

3. A travelling conveyor apparatus comprising a frame, tumbler members rotatably mounted one at each end of said frame, an endless unit made up of a number of trollies interconnected longitudinally, lengths of load carrying surfaces, said endless unit passing round said tumbler members and extending between said tumbler members over an upper load carrying reach and a lower return reach, tracks along which said trollies move and which support and guide said trollies along said upper and lower reaches and round said tumbler members, and endless hauling means attached to said trollies and passing round hauling rollers substantially concentric with said tumbler members, at least one of said hauling rollers being driven by a prime mover; said endless hauling means comprising a number of rope links connected to said trollies and having cross members adapted to engage slots in said hauling rollers to haul said links, trollies and load carrying surfaces.

4. A travelling conveyor apparatus comprising a frame, tumbler rollers rotatably mounted one at each end of said frame, an endless unit formed by a number of longitudinally interconnected trollies and a number of load carrying surfaces interconnecting at least some of said trollies, said endless unit passing round said tumbler rollers and extending between said tumbler rollers over an upper load carrying reach and a lower return reach, tracks along which said trollies move and which support and guide said trollies along said upper and lower reaches and round said tumbler rollers, means for tilting the side portions of said trollies and load carrying surfaces along said upper reach, means for flattening said side portions as they approach said tumbler rollers, endless hauling means attached to said trollies and passing round rollers substantially concentric with said tumbler rollers, at least one of said hauling rollers being driven by a prime mover; said endless hauling means comprising a number of rope links connected to at least some of said trollies and having cross members, at least some of which are connected to some of said trollies, said cross members engaging gaps between projections on sprockets concentric with and driven by said tumbler rollers.

5. A travelling conveyor apparatus comprising a frame, tumbler rollers rotatably mounted one at each end of said frame, an endless unit formed by a number of longitudinally interconnected trollies and a number of load carrying surfaces interconnecting at least some of said trollies, said endless unit passing round said tumbler rollers and extending between said tumbler rollers over an upper load carrying reach and a lower return reach, tracks along which said trollies move and which support and guide said trollies along said upper and lower reaches and round said tumbler rollers, means for tilting the side portions of said trollies and load carrying surfaces along said upper reach, means for flattening said side portions as they approach said tumbler rollers, endless hauling means attached to said trollies and passing round rollers substantially concentric with said tumbler rollers, at least one of said hauling rollers being driven by a prime mover; the top surfaces of said trollies being curved in the direction of travel so that sagging load carrying surfaces are substantially tangential to said top surfaces where they meet them.

6. A travelling conveyor apparatus comprising a frame, tumbler rollers rotatably mounted one at each end of said frame, an endless unit formed by a number of longitudinally interconnected trollies and a number of load carrying surfaces interconnecting at least some of said trollies, said endless unit passing round said tumbler rollers and extending between said tumbler rollers over an upper load carrying reach and a lower return reach, tracks along which said trollies move and which support and guide said trollies along said upper and lower reaches and round said tumbler rollers, means for tilting the side portions of said trollies and load carrying surfaces along said upper reach, means for flattening said side portions as they approach said tumbler rollers, endless hauling means attached to said trollies and passing round rollers substantially concentric with said tumbler rollers, at least one of said hauling rollers being driven by a prime mover and additional drive means intermediate said tumbler rollers, said additional drive means comprising endless chains passing round sprockets one at least of which is driven, said endless chains being arranged in the path of the cross members on the hauling means and having projections which engage said cross members to drive them.

7. A travelling conveyor apparatus comprising a frame, tumbler rollers rotatably mounted one at each end of said frame, an endless unit formed by a number of longitudinally interconnected trollies and a number of load carrying surfaces interconnecting at least some of said trollies, said endless unit passing round said tumbler rollers and extending between said tumbler rollers over an upper load carrying reach and a lower return reach, tracks along which said trollies move and which support and guide said trollies along said upper and lower reaches and round said tumbler rollers, means for tilting the side portions of said trollies and load carrying surfaces along said upper reach, means for flattening said side portions as they approach said tumbler rollers, additional members running on said reach tracks and engaging the undersides of said reach tracks or engaging check rails to prevent said trollies leaving said tracks on curves, said upper and lower reach tracks on the inner radius of curves being raised, and endless hauling means attached to said trollies and passing round rollers substantially concentric with said tumbler rollers, at least one of said hauling rollers being driven by a prime mover.

8. A travelling conveyor apparatus according to claim 6 in which said tumbler rollers and/or said hauling rollers and said intermediate drive means are driven by separate prime movers, all of said prime movers being controllable in synchronized relationship to ensure a substantially even haul to the whole endless load carrying unit.

9. A travelling conveyor apparatus comprising a frame, tumbler rollers rotatably mounted one at each end of said frame, an endless unit formed by a number of longitudinally interconnected trollies and a number of load carrying surfaces interconnecting at least some of said trollies, said endless unit passing round said tumbler rollers and extending between said tumbling rollers over an upper load carrying reach and a lower return reach, tracks along which said trollies move and which support and guide said trollies along said upper and lower reaches and round said tumbler rollers, means for tilting the side portions of said trollies and load carrying surfaces along said upper reach, means for flattening said side portions as they approach said tumbler rollers, endless hauling means attached to said trollies and passing round rollers substantially concentric with said tumbler rollers, at least one of said hauling rollers being driven by a prime mover, side screens at least at the parts of the apparatus where said trollies are flattened, and means for adjusting the tension in said load carrying surfaces.

10. Conveyor apparatus comprising a frame structure; an endless series of trollies supported on said structure, each trolley having a flat central section extending transversely of the longitudinal axis of the conveyor and side sections articulated to the ends of said central section; an endless drive element positively interconnecting said trollies at even spacings; a flexible load-carrying surface spanning, and secured to, at least some of said trollies; an end tumbler journalled at each end of said structure for guiding both said endless series of trollies and said load-carrying surface between upper and lower conveyor flights; drive means rigid with at least one of said tumblers and positively engaged by said endless drive element for imparting the necessary haul to the conveyor; and rails extending between said tumblers for supporting said trollies and for raising said trolley side-sections along the top flight of the conveyor.

11. Conveyor apparatus comprising a frame structure; an end tumbler journaled at each end of said structure; an endless driving element extending for the full length of the upper and lower flights of the conveyor and passing round each end tumbler and in driving engagement with at least one of said tumblers; driving means for rotating at least said one tumbler; a series of load supporting trollies secured to said endless driving element and spaced thereby at predetermined distances lengthwise of the conveyor, each of said trollies having a tranverse horizontal central section and side sections articulated thereto for upward deflection out of the plane of said central section; a flexible load-carrying surface supported on and secured to at least some of said trollies at their central and side portions; and rails mounted on said frame structure and extending along each side of the upper and lower flights of the conveyor between the end tumblers to support and guide said trollies, said rails along the upper flight having an elevated central section and downwardly inclined ramps adjacent the respective end tumblers whereby to raise the side sections of the trollies out of the plane of their central portions after leaving the tumbler at the input end of the conveyor and lower said side sections into the plane of their central sections before passing round the tumbler at the discharge end of the conveyor.

12. A conveyor having a frame structure and input and discharge end tumblers journalled therein at opposite ends; and endless haulage element passing round said end tumblers and in driving engagement with at least one of them; driver means coupled to at least the said one end tumbler; a series of spaced trollies each coupled in haul-transmitting relation to said haulage element and maintained at predetermined spacings by said haulage elements, each of said trollies extending transversely of the length of the conveyor and comprising a flat, generally horizontal, central section and a side section articulated thereto at each end so as to lie collinear therewith in the flattened position but with freedom to swing relatively thereto so as to present a trough shape; supporting wheels on each trolley; upper and lower rigid wheel tracks fixed to the frame structure and extending lengthwise of the conveyor between the end tumblers for supporting said trolley wheels along the upper and lower conveyor flights, respectively, said upper tracks having inclined ramp portions adjacent each end tumbler and a raised intermediate portion whereby the side sections of each trolley are raised to the troughed position as it leaves the input end tumbler and lowered to the flattened position as it reaches the discharge end tumbler; rigid substantially semi-circular arcuate tracks fixed to the frame structure concentrically with the axis of rotation of each tumbler, each arcuate track lying in the path of the appropriate trolley wheels and serving to guide each trolley in the flattened position from the adjacent end of a lengthwise track along one flight to the corresponding end of a lengthwise track along the other flight; and a flexible load-carrying member secured to the central and side sections of at least some of the trollies.

13. A conveyor having a frame structure and input and discharge end tumblers journalled therein at opposite ends; an endless haulage element passing round said end tumblers and in driving engagement with at least one of them; a drive to at least the said one end tumbler; and endless series of equally spaced trollies coupled to and maintained in spaced relationship by said haulage element, each of said trollies having a main central section extending transversely of the conveyor and side sections articulated thereto at their respective inner ends; a first set of wheels journalled on each end of the main central section; a second set of wheels supported for relative sliding displacement in the same plane as and beneath the respective wheels of the first set; a linkage connecting the wheels of the second set to the respective side sections of each trolley; rigid arcuate tracks fixed to the frame structure concentrically with the axis of each end tumbler for engagement by the first set of wheels of each trolley while it passes round the said tumbler; rigid lengthwise tracks secured to the frame structure along the upper flight of the conveyor for engagement by the second set of wheels of each trolley; inclined ramp portions at each end of said upper flight lengthwise tracks for raising said trolley side sections as each trolley leaves the input end tumbler and for lowering said side sections as it approaches the discharge end tumbler; and rigid lower flight lengthwise tracks secured to the frame and registering at each end with the respective adjacent arcuate tracks for engagement by the wheels of said first set on each trolley.

References Cited in the file of this patent

UNITED STATES PATENTS

| Number | Name | Date |
| --- | --- | --- |
| 483,475 | Pollock | Sept. 27, 1892 |
| 809,827 | Lucas | Jan. 9, 1906 |
| 968,211 | Vrooman | Aug. 23, 1910 |
| 1,136,773 | Chapman | Apr. 20, 1915 |
| 2,594,342 | Pettyjohn | Apr. 29, 1952 |